2 Sheets--Sheet 1.

C. SCHNEIDER.
Hand-Propelling Carriages.

No. 157,547.      Patented Dec. 8, 1874.

Witness
Horace Harris
John C. Tunbridge

Inventor
Charles Schneider

2 Sheets--Sheet 2.

C. SCHNEIDER.
Hand-Propelling Carriages.

No. 157,547. Patented Dec. 8, 1874.

Witness
John C. Tunbridge.
John H. Ross.

Inventor
Charles Schneider
By Horace Harris atty

UNITED STATES PATENT OFFICE.

CHARLES SCHNEIDER, OF NEWARK, NEW JERSEY.

IMPROVEMENT IN HAND-PROPELLING CARRIAGES.

Specification forming part of Letters Patent No. 157,547, dated December 8, 1874; application filed October 1, 1874.

*To all whom it may concern:*

Be it known that I, CHARLES SCHNEIDER, of Newark, in the county of Essex and State of New Jersey, have invented certain Improvements in Hand-Propelling Carriages, of which the following is a specification:

My invention consists in propelling a carriage by hand-power, happily combining cranks, gears, and pitmen; and, also, in the devices employed for steering the carriage.

Figure 1:
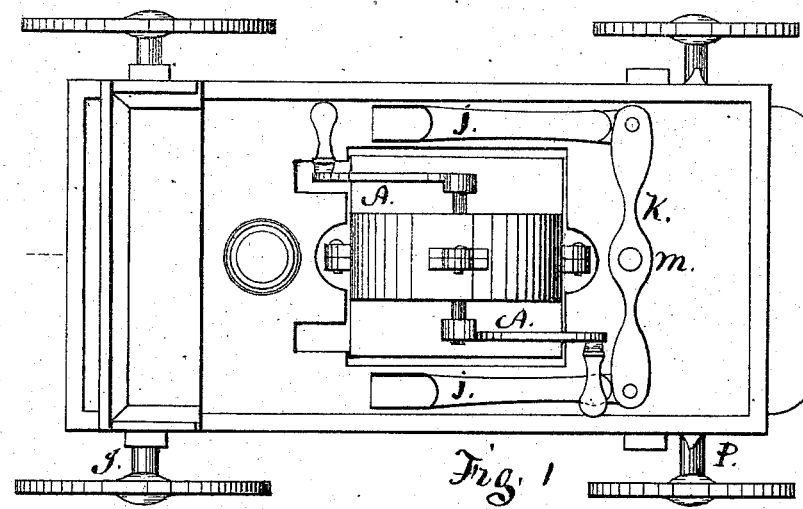
Figure 2:
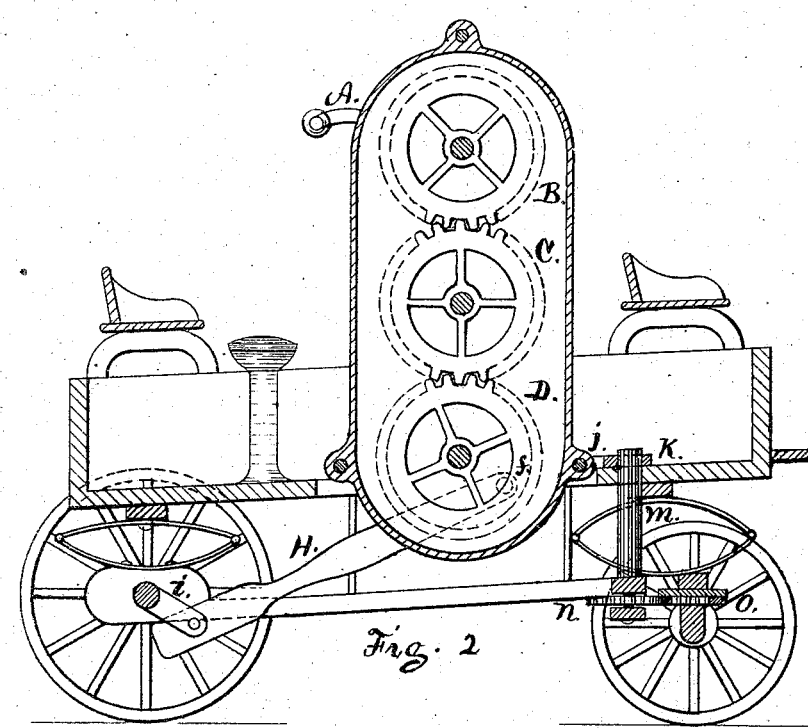
Figure 3:
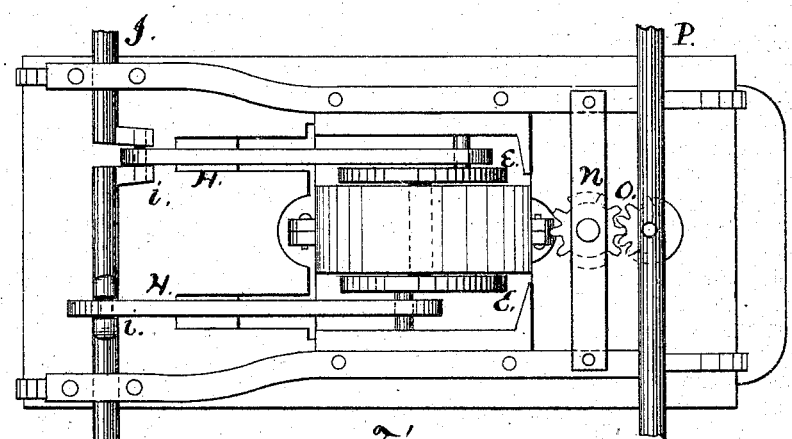

Figure 1 is a plan view. Fig. 2 is a longitudinal cross-section. Fig. 3 is an inverted view.

In the construction of the devices the cranks A are attached to the axle of the gear B, and this gear works in the edge of the gear C and communicates motion to the gear D. On each side of this gear is secured, on the same axle, a balance-wheel, E. (See Fig. 3.) These wheels are each provided with a crank-pin, $f$. These pins are set a quarter-circle apart, and connected with each is a pitman, H, reaching back to the hind axle I. This axle is constructed with two cranks, $i\,i$, set at a quarter or at right angle to each other, to correspond with the pins.

The object of these angles is to avoid a dead-center from one crank, or from two, when they are placed directly opposite to each other. In the position I place the two sets of cranks, one of each set is always in active operation when the other is passing the dead-center, which gives great advantage in working.

In the steering apparatus, as seen in Figs. 2 and 3, $j\,j$ are arms, jointed to a cross-bar, K, which is fastened in the center to an upright rod, $m$, on which, at the lower end, is a gear, $n$, which works in a gear, O, attached to the front axle P. These arms are within the reach of the feet of the operator or operators, and pushing on either turns the carriage.

It will be seen that the steering apparatus is not new, except the combination with the arms, to be operated with the feet.

I claim—

1. The crank A, in combination with the gears C and D, the balance-wheels E, pins $f$, pitman H, and axle J, substantially as and for the purposes specified.

2. The gear D, with the crank-pins $f$ and balance-wheels E, in combination with the gears C and B and pitmen H, substantially as and for the purposes specified.

3. The two pitmen H, in combination with the pins $f$, attached to the balance-wheels E, and with the cranks $i\,i$, set at quarter-angle to each other on the axle I, substantially as and for the purposes specified.

4. The combination of arms $j\,j$, cross-bar K, rod $m$, and gears $n$ and O, substantially as specified.

CHARLES SCHNEIDER.

Witnesses:
 HORACE HARRIS,
 JOHN C. TUNBRIDGE.